Aug. 29, 1967  E. K. CABLE ET AL  3,339,033
ROTARY SELECTOR SWITCH WITH CAM OPERATED CONTACTS
Filed April 16, 1964

INVENTORS
ELVIN K. CABLE
BY KIMBALL C. STEVENS

THEIR ATTORNEYS

United States Patent Office 3,339,033
Patented Aug. 29, 1967

3,339,033
ROTARY SELECTOR SWITCH WITH CAM
OPERATED CONTACTS
Elvin K. Cable, New Carlisle, Ohio, and Kimball C.
Stevens, Lincoln, Mass., assignors to Ledex, Inc., Dayton, Ohio, a corporation of Ohio
Filed Apr. 16, 1964, Ser. No. 360,382
2 Claims. (Cl. 200—30)

This invention relates to a selector switch and more particularly to a rotary selector mechanism for selecting switch connections from a plurality of switch mechanisms, however, the invention is not necessarily so limited.

A typical form of rotary selector switch comprises a fixedly mounted stator element surrounding a rotatable rotor element. The stator element supports a plurality of switch contacts, each provided with a terminal for connection to an electrical circuit. The rotor element supports one or more contacts adapted to selectively engage one or more of the stator contacts. By separate terminal means, the rotor contact or contacts are also adapted for connection into an electrical circuit or circuits, the direction of current flow in such switch devices being from stator contact to rotor contact, or vice versa. As an alternate, current flow may be from one stator contact to a rotor contact and then back to a second stator contact. In both of the foregoing operations, current passes through both rotor and stator contacts.

For some applications, a current flow from rotor contacts to stator contacts, or vice versa, is undesirable and a demand exists for rotary selector switch mechanisms wherein all current carrying contacts are mounted on one of the rotor element and stator elements of the selector switch with no current flow occurring between such rotor and stator elements.

It is, accordingly, an object of the present invention to provide a rotary selector switch wherein all current carrying contacts of the selector switch are mounted on the stator element of the switch.

It is a further object of the present invention to provide an improved selector switch having a reduced friction between the operating parts thereof.

A further object of the present invention is to provide a rotary selector switch having a plurality of independent switch elements selectively operated by a rotary selecting mechanism.

Still another object of the present invention is to provide a new and improved selector mechanism for use in rotary selector switches, said selector mechanism being characterized by movable and replaceable parts affording substantial design flexibility.

Other objects and advantages reside in the construction of parts, the combination thereof, the method of manufacture and the mode of operation as will become more apparent from the following description.

In the drawing, FIGURE 1 is a fragmentary plan view of a partially assembled rotary selector switch constructed in accordance with the present invention and illustrating an operator therefor.

Figure 1:
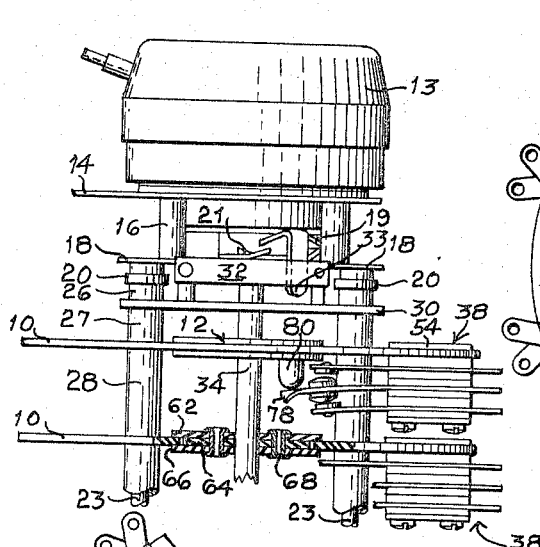

Referring to the drawing in detail, FIGURE 1 illustrates an assembly of stator wafers 10 with rotor wafers 12 mounted therein for rotation by an operator 13. The operator 13 may be an electromagnetic stepping mechanism, such as illustrated in United States Letters Patent No. 2,501,950 issued to G. H. Leland, Mar. 28, 1950. The operator 13 is preferably secured to a suitable supporting bracket 14. Projecting outwardly from the supporting bracket 14 are spacers 16 which secure an adapter bracket 18 in fixed relation to the operator 13. As appears more fully in the above mentioned Patent 2,501,950, the operator 13 reciprocates a driving ratchet 19 which engages a driven ratchet 21 during its power stroke, the result being that the reciprocation of the driving ratchet 19 produces stepwise rotary movement of the driven ratchet 21. Driven ratchet 21 is attached to an elongated drive shaft 34, whereby the stepwise rotary movement of the ratchet 21 is impressed upon the drive shaft 34.

The adapter bracket 18 supports fixedly attached internally threaded nuts 20, which receive elongated threaded studs 23. Mounted on the studs 23 are various spacer elements, such as illustrated at 26, 27 and 28, and which establish a spaced relation between the various wafers 10. Located between the spacers 26 and 27 is a control wafer 30 supporting an interrupter switch 32 which is operated by a lug 33 projecting from the ratchet 19. The function of the interrupter switch 32 is to interrupt the supply of power available through a contact provided on the wafer 30 to the operator 13 at the end of each stepping cycle. The operator 13 and the various accessories thereto by which stepping rotary motion is imparted to the shaft 34 form no part of the present invention.

Figure 2:
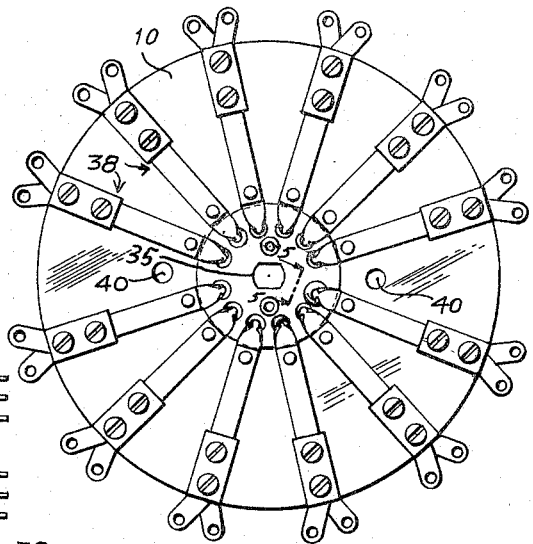
FIGURE 2 is a plan view of a fully assembled rotor and stator combination for use in the switch of FIGURE 1.

As best seen in FIGURE 2, each of the wafers 10 supports twelve leaf spring switch assemblies designated by the reference numeral 38. The leaf spring switch assemblies are arranged at substantially equal peripheral spaces in two groups of six, the two groups of six being separated by relatively large peripheral spaces, the latter spaces providing room for apertures 40 in the wafers 10 to receive the mounting studs 23 and to provide room for the spacers encircling such mounting studs.

Figure 3:
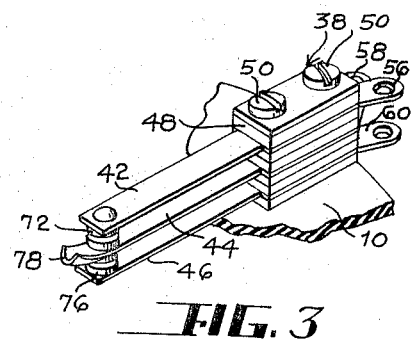
FIGURE 3 is an enlarged fragmentary, perspective view illustrating current carrying contact members for use in the switch assembly of FIGURES 1 and 2.

As best seen in FIGURE 3, each of the leaf spring switch assemblies comprises a series of three resilient spring conductors 42, 44 and 46, separated by suitable insulating plates, as shown at 48. The assembly of conductors and intermediate insulating plates 48 is fixedly mounted to the wafers 10 by means of screws 50 which pass through the assembled insulating plates and conductors and through the stator wafer 10 to engage threaded apertures in a retaining plate 54.

The spring conductors 42, 44 and 46 terminate at their radial outermost ends with lead supporting terminal portions 56, 58 and 60, respectively. At their opposite or radial innermost ends, the conductors 42 and 46 support contact buttons 72 and 76, respectively. Near its radial innermost end, the spring conductor 44 supports a contact button 74 having oppositely directed faces for engagement with either or both of the contact buttons 72 and 76.

At its radial innermost end, the spring conductor 44 is provided with an extension 78, the side margins of which are bent upwardly, as illustrated in FIGURE 3, to form a cam follower element having the shape of a convergent trough.

By virtue of the cam follower extensions 78 of the conductors 44, each of the switch elements mounted on each of the stator wafers 10 is adapted to be selectively actuated by a cam member 80 carried by the rotor wafer assembly 12. As illustrated in FIGURE 1, the rotor wafer assembly 12 comprises three wafers 62, 64 and 66 secured in face contacting relation by suitable rivets 68. The wafer 64 is adapted to rotate without substantial friction in a stator wafer 10 and the wafers 62 and 66 have a larger diameter so as to confine the rotor wafer assembly against axial movement away from such stator wafer 10.

The rotor wafer assemblies are each provided with twelve axially extending apertures 82 arranged at substantially equal peripheral spaces. Any one of said apertures is adapted to receive a projection 84 formed on the cam member 80 and having a binding fit in such aperture. By virtue of this construction, each of the rotor wafer assemblies 12 may support any number of cam members 80 and may support any given cam member 80 at any one of twelve positions.

Each of the rotor wafer assemblies has a centrally disposed double D aperture 35 which receives the shaft 34 having a corresponding double D shape, such that all rotary movements of the shaft 34 are transmitted to the rotor wafer assemblies 12. Thus, successive operations of the shaft 34 will result in movement of the cam member 80 into successive engagement with successive ones of the cam followers 78, with the result that successive ones of the switch assemblies 38 are actuated by the cam member 80. It will be recognized by those skilled in the art that a great quantity of combinations of actuating sequences are possible.

Figure 5:
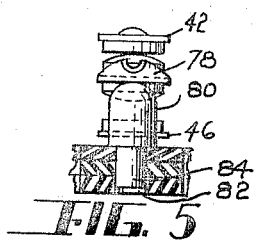
FIGURE 5 is a sectional view, taken substantially along the line 5—5 of FIGURE 2.

The switch assemblies illustrated are of a type wherein the spring conductors 44 and 46 are normally in contact through their contact buttons 74 and 76. On the other hand, the conductors 42 and 44 are normally out of contact, or open-circuited. Movement of the cam member 80 against a cam follower 78 causes such cam follower to move downwardly, as viewed in FIGURE 1, forcing the spring conductor 44 downwardly out of contact with the conductor 46 and into contact with the conductor 42. Thus, the circuit between the conductors 44 and 46 is opened at the same time the circuit between the conductors 42 and 44 is closed. The latter condition is illustrated in FIGURE 5.

The wiping action of the cam member 80 against the cam follower 78 is accomplished with a minimum of frictional resistance due to the curvature which is formed in the bottom of the cam follower 78 by the downwardly bent side margins thereof. The rounded crown on the top of the cam member also functions to reduce friction by minimizing the area of contact between the cam and cam follower members.

The coefficient of friction between the cam member 80 and the cam followers 78 is preferably further reduced by fabricating the cam member 80 of a plastic material, such as nylon or polyethylene known to have a low coefficient of friction when in contact with metallic surfaces.

It will be recognized by those skilled in the art that other designs for the cam and cam follower elements 80 and 78 of the present invention may be employed, the essential characteristic being that one of the two elements has a surface inclined with respect to the plane of the trajectory followed by the cam member, with the result that the cam follower is urged axially by engagement with the orbiting cam member. The particular trough-shaped cam followers illustrated are preferred for use in the present invention because of the simplicity of construction and also because of the arrangement by which the cam followers 78 collectively restrain the cam member 80 against detachment from its supporting rotor wafer assembly. Thus, it is found that by proper spacing of the radially disposed switch assemblies, there will be no gap between adjacent cam follower troughs 78 sufficiently wide to permit removal of the cam member 80 which acts against the troughs.

Figure 4:
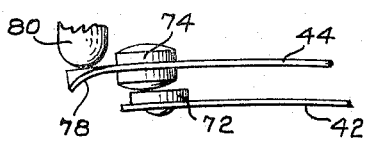
FIGURE 4 is a further enlarged fragmentary, side elevational view illustrating the operation of the spring contact elements employed in the present invention.

FIGURE 4 illustrates the manner in which the spring conductors 42 and 44 are flexed upon movement of the cam member 80 against the cam follower 78. As a result of the flexure, the conductors are each bent about a different axis, such that the contact button 74 is caused to wipe along the surface of the button 72. Such wiping action has the desirable result that the conducting surfaces of the buttons 72 and 74 are continually renewed by frictional wear. The extent of the foregoing wiping action can be modified by adjusting the elevation of the cam member 80 about its supporting wafer assembly 12.

Figure 6:
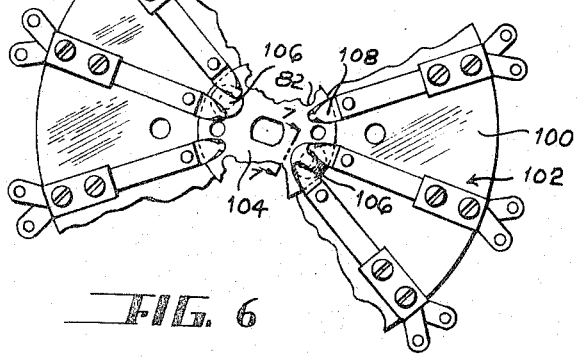
FIGURE 6 is a fragmentary plan view illustrating a modification.
Figure 7:
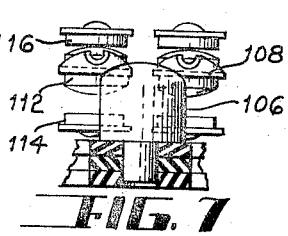
FIGURE 7 is a sectional view, taken substantially along the line 7—7 of FIGURE 6.

FIGURES 6 and 7 illustrate a modification wherein a rotor wafer assembly 104, similar to the assembly 12 previously described, is mounted for rotation within a stator wafer 100 supporting peripherally spaced switch assemblies 102, also similar to the assemblies 38 previously described. The essential difference between the modification and the preferred embodiment resides in the design of the cam members 106 which actuate the switch assemblies 102 by engagement with the cam follower troughs 108 formed on the switch assemblies.

In the modification, two cam members 106 are mounted on each rotor wafer assembly and each of the cam members 106 is of a larger diameter than the cam members 80 previously described. The diameter of the cam members 106 is large enough that as the cam members are moved through a circular trajectory, so as to successively actuate the switch assemblies 102, each succeeding switch assembly is actuated before the immediately preceding switch assembly has been disengaged. This condition is illustrated in FIGURE 7 which shows a single cam member 106 simultaneously engaging two cam follower members 108 so as to separate contacts 112 from contacts 114 and, at the same time, press the contacts 112 against contacts 116.

By employing two cam members 106 on a single rotor wafer assembly, as illustrated in FIGURE 6, a single pair of rotor and stator wafers is rendered capable of serving as two separate rotary selector switches. Thus, if the stator wafer supports twelve switch assemblies 102, six adjacent switch assemblies can operate as one rotary selector switch and the other six adjacent switch assemblies can operate as a separate selector switch.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In a rotary switch device, the combination comprising a stationary member, a rotary member, means supporting said rotary member for rotation about a rotary axis relative to said stationary member, a plurality of switch assemblies supported by said stationary member, each said switch assembly including a pair of contact elements, one of the contact elements in each said switch assembly including an elongated radially disposed blade portion, said stationary member supporting the radially outer end of said blade portion and the radially inner end of said blade portion being movable between first and second axially spaced positions by flexure of said blade portion, the contacts of each said assembly being engaged in one of said positions and disengaged in the other of said positions, a cam supported by said rotary member and movable along a circular trajectory by rotation of said rotary member, said one contact element of each said switch assembly supporting a cam follower at its radially innermost end and in said trajectory, said cam followers comprising extensions of the radially innermost ends of said blade portions, each said extension having the shape of a convergent trough, said extensions each converging in the direction of said rotary axis, each said cam follower having an axially inclined surface portion engageable with said cam whereby movement of said cam in said trajectory to engage said cam followers results in axial movement of said blade portions between said first and second positions, said axially inclined surface portions constituting, for each said blade portion, a side surface of the extension thereof.

2. In a rotary switch device, the combination comprising a stationary member, a rotary member, means supporting said rotary member for rotation about a rotary axis relative to said stationary member, said stationary member comprising an annular wafer member having a central aperture encircling said rotary axis and said rotary member comprising a wafer member disposed within said central aperture and coplanar with said stationary member, a plurality of switch assemblies supported by said stationary member, each said switch assembly including a pair of contact elements, one of the contact elements in each said switch assembly including an elongated radially disposed blade portion, said stationary member supporting the radially outer end of said blade portion and the radially inner end of said blade portion being movable between first and second axially spaced positions by flexure of said blade portion, the contacts of each said assembly being engaged in one of said positions and disengaged in the other of said positions, a cam supported by said rotary member and movable along a circular trajectory by rotation of said rotary member, said one contact element of each said switch assembly supporting a cam follower at its radially innermost end and in said trajectory, one of said cam and cam follower elements having an axially inclined surface portion engageable with the other of said cam and cam follower elements whereby movement of said cam in said trajectory to engage said cam followers results in axial movement of said blade portions betwen said first and second positions.

References Cited
UNITED STATES PATENTS 3,166,379 12/1963 Foster _____ 200—30
3,169,176 2/1965 Fisher _____ 200—153 X ROBERT K. SCHAEFER, *Primary Examiner.*

K. H. CLAFFY, *Examiner.*

H. BURKS, W. C. GARVERT, *Assistant Examiners.*

UNITED STATES PATENT OFFICE
CERTIFICATE OF CORRECTION

Patent No. 3,339,033 August 29, 1967

Elvin K. Cable et al.

It is hereby certified that error appears in the above numbered patent requiring correction and that the said Letters Patent should read as corrected below.

Column 6, after line 16, insert the following:

```
2,954,443    9/1960    Diggins, et al----200-153X
3,025,362    3/1962    Thomas------------200-30
3,030,461    4/1962    Gantz-------------200-153X
``` same column 6, line 17, for "3,166,379" read -- 3,116,379 --.

Signed and sealed this 24th day of September 1968.

(SEAL)
Attest:

Edward M. Fletcher, Jr.
Attesting Officer

EDWARD J. BRENNER
Commissioner of Patents